United States Patent [19]

Kubota et al.

[11] Patent Number: 5,787,171
[45] Date of Patent: Jul. 28, 1998

[54] DATA TRANSMITTER AND RECEIVER

[75] Inventors: Ichiro Kubota, Kanagawa; Masaki Hirose, Tokyo, both of Japan

[73] Assignee: Sony Corporation, Tokyo, Japan

[21] Appl. No.: 494,573

[22] Filed: Jun. 22, 1995

[30] Foreign Application Priority Data

Jun. 28, 1994 [JP] Japan ................... 6-146165
Jul. 6, 1994 [JP] Japan ................... 6-154394

[51] Int. Cl.$^6$ .................. H04L 9/00; H04L 9/08; H04L 9/32; H04N 7/167
[52] U.S. Cl. ............... 380/20; 380/9; 380/10; 380/21; 380/23; 380/25; 380/49; 380/50
[58] Field of Search .............. 380/4, 9, 10, 20, 380/21, 23, 24, 25, 49, 50

[56] References Cited

U.S. PATENT DOCUMENTS

| 4,712,239 | 12/1987 | Frezza et al. | 380/20 |
| 4,965,825 | 10/1990 | Harvey et al. | 380/9 |
| 5,109,414 | 4/1992 | Harvey et al. | 380/9 |
| 5,233,654 | 8/1993 | Harvey et al. | 380/20 |

*Primary Examiner*—Bernarr E. Gregory
*Attorney, Agent, or Firm*—Frommer Lawrence & Haug LLP; William S. Frommer

[57] ABSTRACT

A data transmitter capable of preventing illegal free reception of transmitted data by scrambling the same, and a data receiver adapted to descramble the received data properly despite any alteration of a scramble program. The data transmitter comprises a data source where predetermined data to be transmitted is stored; a circuit for generating a scramble program and control data; a circuit for scrambling the predetermined data in accordance with the scramble program; a circuit for generating a descramble program; and a circuit for transmitting the scrambled data, the descramble program and the control data to the data receiving terminal of each user or contractor. The control data includes a scramble key, and the scrambled data is transmitted via a satellite network or a CATV network, while the descramble program is transmitted via a telephone line. The data receiver is equipped with a circuit for descrambling the received data in accordance with the descramble program, and a circuit for compiling an intermediate code, which is included in the descramble program and is not dependent on any hardware, into a machine code.

29 Claims, 9 Drawing Sheets

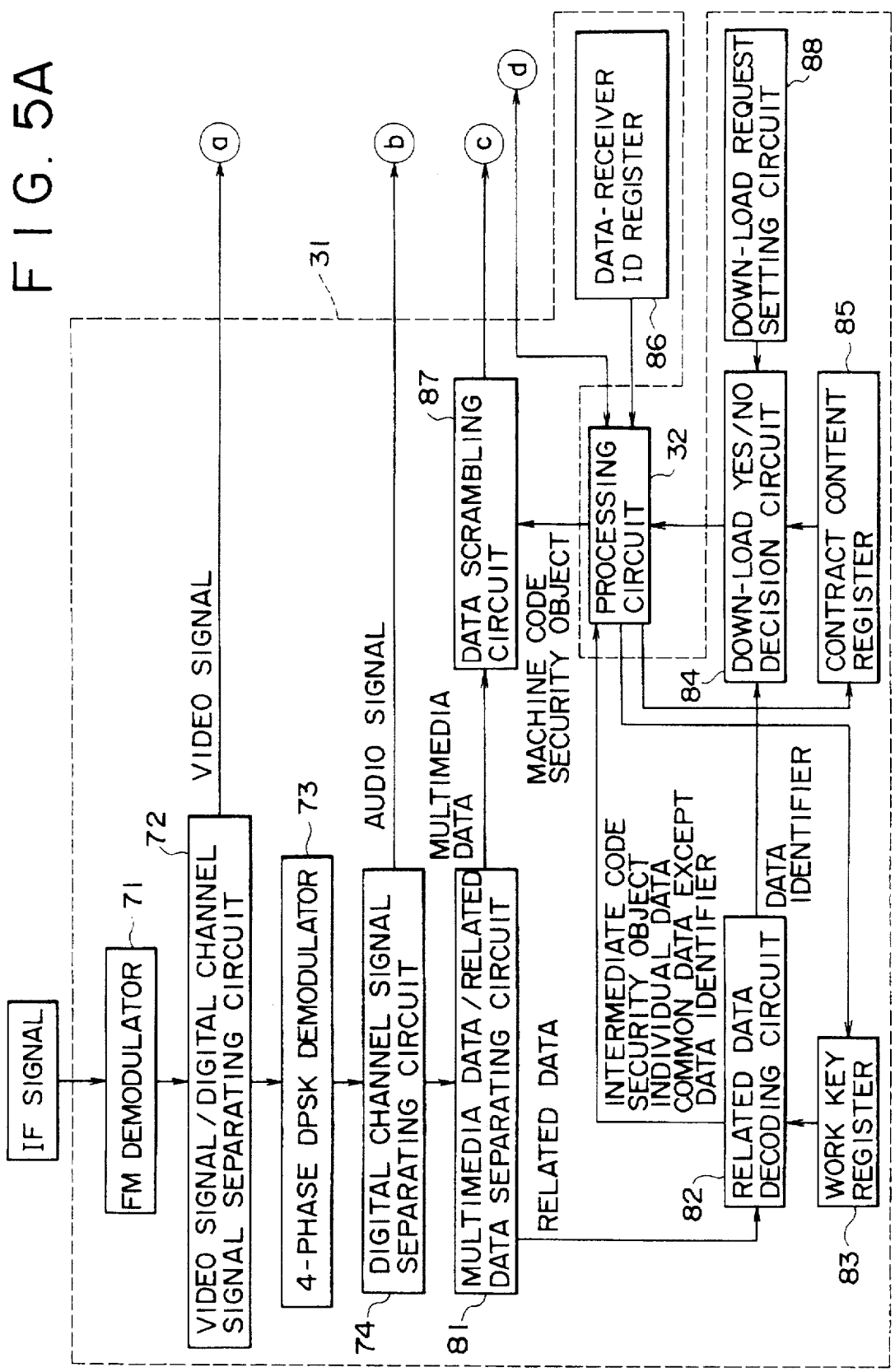

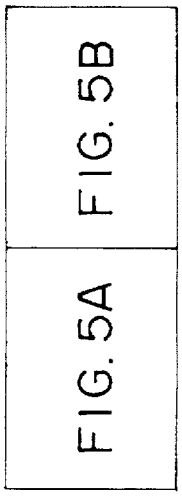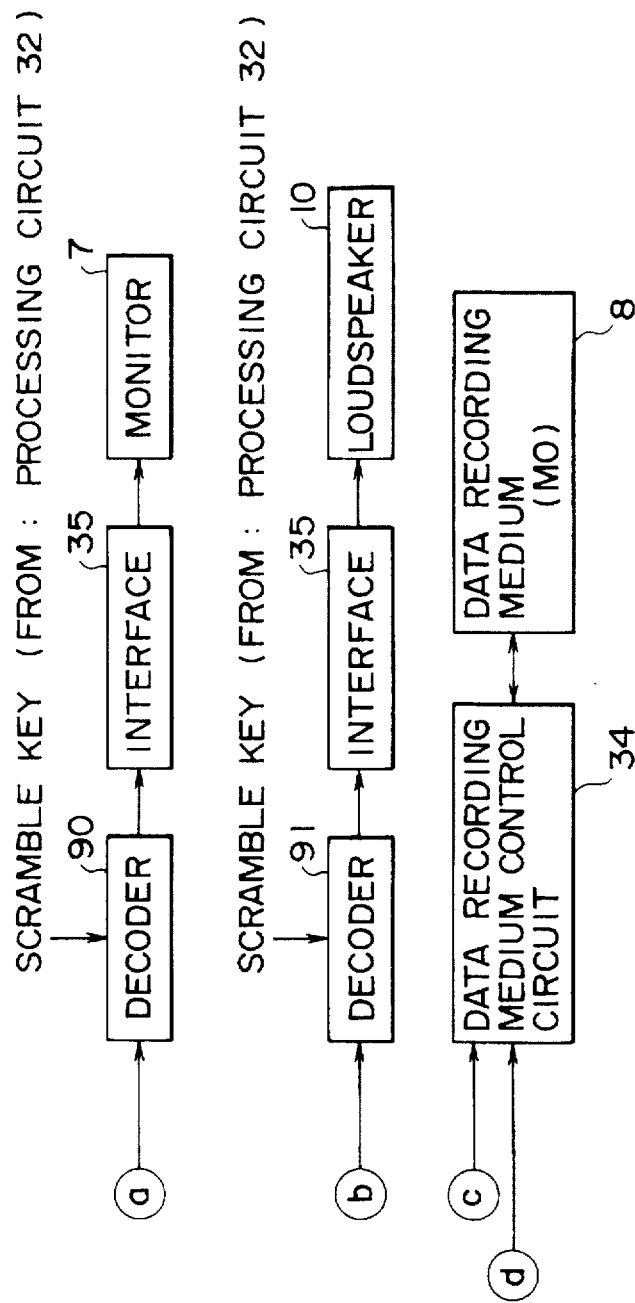

DATA TRANSMITTER AND RECEIVER

BACKGROUND OF THE INVENTION

1. Field of the Invention

The present invention relates to a data transmitter for scrambling and transmitting data of, e.g., publications (newspapers, books, magazines, etc.), and also to a data receiver adapted for receiving such scrambled data.

2. Description of the Related Art

In pay television broadcast (or music broadcast) utilizing a broadcasting satellite for example, a program is transmitted after being scrambled in an attempt to prevent illegal interception of the program by any non-contractor. Therefore, any audience or listener who desires such program makes a contract for reception with a program provider and is enabled to receive a scramble key to decode the scrambled program, whereby the scrambled program is descrambled on the receiving side and is rendered intelligible for the regular contractor. The technique of transmitting such a descramble key is disclosed in, e.g., U.S. Pat. No. 4,533,949.

Recently, for electronic transmission of data of newspapers and so forth (hereinafter referred to as newspaper data), there is contrived a novel data broadcasting system which inserts newspaper data in a satellite data channel and transmits the same via the satellite. In this case, a signal from the satellite is received by a data receiver in each home (contractor) having made a contract to receive the newspaper data, and the newspaper data inserted in the data channel is extracted from the signal. Then the newspaper data is recorded on a recording medium such as a magnetic disk or a magneto-optical disk and can be read out therefrom at any time the contractor desires. The newspaper data thus read out is visually represented on a display device or is printed out, whereby the contractor is enabled to read the newspaper.

In this data broadcasting system also, newspaper data is scrambled for the purpose of preventing illegal reception, and on the contractor side, the data is descrambled by using the received scramble key.

In the system mentioned above, descramble is executed on the contractor side in accordance with a predetermined algorithm. Therefore, when the algorithm is once known to any non-contractor, descramble can be executed with facility even if the scramble key is altered, so that a problem of illegal reception still remains unsettled.

Further, in case the system is so arranged that the data is decoded on the basis of a decode key in a decoder installed in a data receiving terminal, if a regular contractor having received the decode key informs any non-contractor of the decode key illegally, then the scrambled data can be decoded by the non-contractor as well to thereby bring about another problem that the data is acquired without charge. In addition, there may occur a defenseless state against illegal reception in the future due to a probable advanced technique relative to illegal descramble of the scrambled data, and in the worst case, serious problems may arise inclusive of the necessity of replacing the data receiving terminals for the entire users.

SUMMARY OF THE INVENTION

The present invention has been accomplished in view of the circumstances mentioned. And its principal object resides in realizing prevention of illegal reception by reinforcing the security control of broadcast contents.

It is another object of the present invention to provide an improved data transmission system which is capable of preventing illegal free reception or taking a prompt proper countermeasure even if the descramble key is illegally acquired by any non-contractor or if the possibility of illegal descramble is rendered possible by progress of the descrambling technique.

According to one aspect of the present invention, there is provided a data transmitter which is equipped with a scramble means for scrambling data and also transmits an object including at least a descramble program prepared for descrambling the data processed by the scramble means.

In this data transmitter, the data may be those of publications. Both the data and the object can be transmitted via a satellite network or a CATV network. Furthermore the data and the object can be transmitted via different transmission lines as well. And the descramble program can be formed into an intermediate code which is not dependent on any hardware.

According to another aspect of the present invention, there is provided a data receiver which is adapted to receive the scrambled data from the above-described data transmitter and is equipped with a descramble means for descrambling the scrambled data in accordance with the descramble program.

According to a further aspect of the present invention, there is provided a data receiver equipped with a compile means for compiling an intermediate code, which is included in a descramble program, into a predetermined machine code, and a descramble means for descrambling the scrambled data in accordance with a predetermined machine code.

In the data receiver mentioned, a recording means may further be incorporated to record the intermediate code of the descramble program on a recording medium, wherein the intermediate code of the descramble program recorded on the recording medium can be complied by the compile means.

Thus, in the data transmitter of the present invention, data is transmitted after being scrambled, and simultaneously there is also transmitted an object which includes at least a descramble program prepared for descrambling the data. Therefore, the security control can be reinforced by changing the scramble algorithm either periodically or non-periodically for example and transmitting a descramble program which corresponds to the altered algorithm, thereby preventing illegal reception on the receiving side.

Meanwhile in the data receiver of the present invention, the scrambled data obtained from the data transmitter is received and descrambled in accordance with the descramble program. Consequently, proper descramble can be performed even if the scramble algorithm is altered on the transmitting side.

In another data receiver of the present invention, the data sent from the data transmitter is received, and then the intermediate code of the descramble program is compiled into a predetermined machine code. And the scrambled data is descrambled in accordance with the machine code thus compiled. Therefore the descramble processing system may be constituted of a virtual machine to consequently realize an advantage that the data receiver can be constructed without the necessity of using any exclusive hardware.

The above and other features and advantages of the present invention will become apparent from the following description which will be given with reference to the illustrative accompanying drawings.

BRIEF DESCRIPTION OF THE DRAWINGS

FIG. 5, made up of FIG. 5A and 5B, is a block diagram showing a detailed constitution of a data receiving circuit 31 in FIG. 4;

DETAILED DESCRIPTION OF THE PREFERRED EMBODIMENTS

Figure 1:
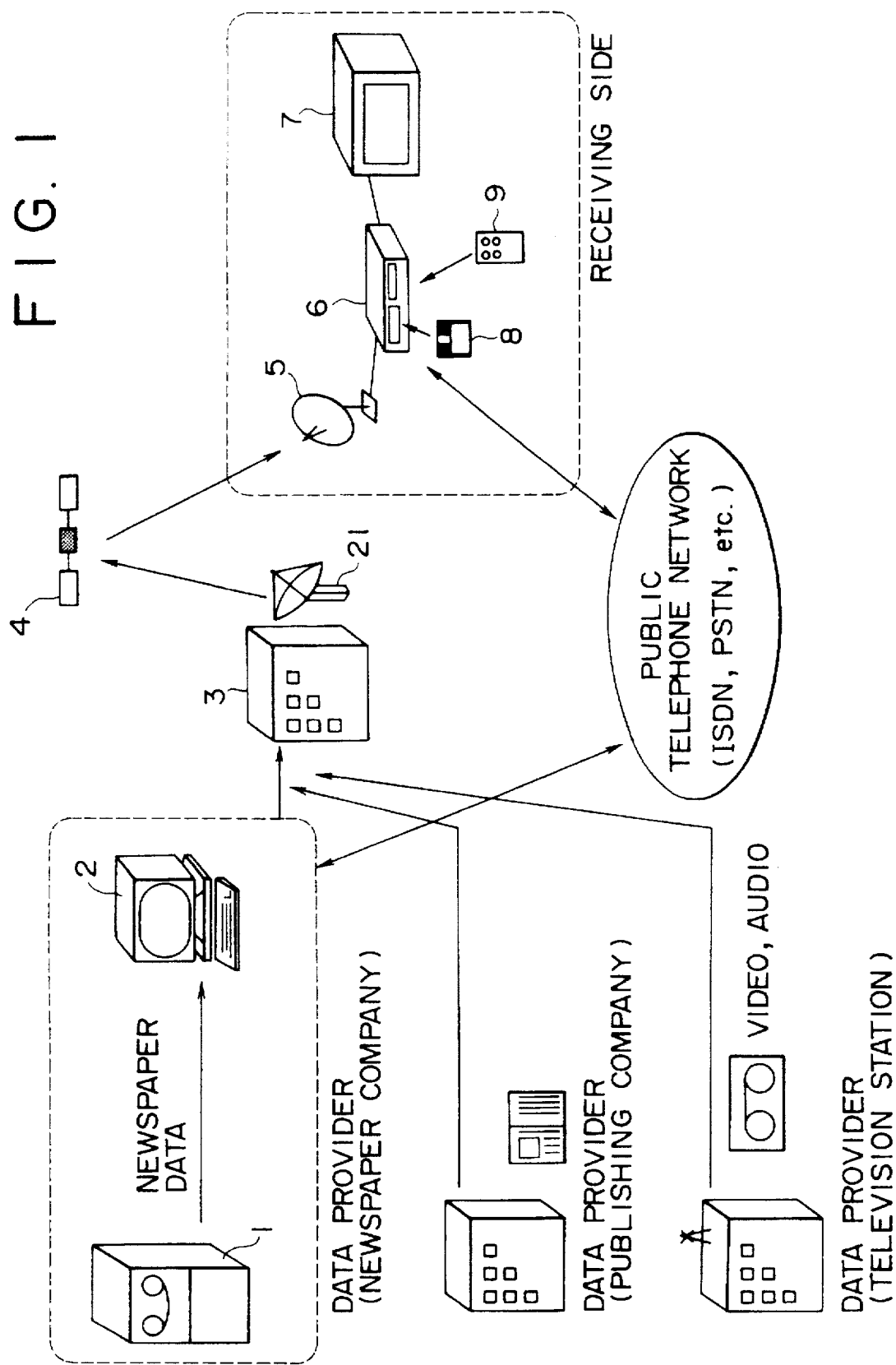
FIG. 1 illustrates an exemplary constitution of a data transmission system to which the present invention is applied.

FIG. 1 illustrates an exemplary constitution of a data transmission system to which the present invention is applied. According to this data transmission system, multimedia data composed principally of data of publications such as newspapers, books and magazines are transmitted, and on the receiving side, the received data are recorded on a recording medium so that the user can read out the data therefrom to view or listen to the same at any desired time.

A newspaper company as a data provider has a large computer 1 where a paper data base is stored. The paper data base includes information of articles, photographs and drawings to be printed on a newspaper, and also information for layout. The entire data in such data base are digitized previously and are transferred, when necessary, to an editing device 2 so as to be edited therein.

More specifically, the data in the data base are edited, per paper space, in an adequate format retrievable with facility by the user on the receiving side. For example, there is formed, by this editing, a retrieval picture where the paper space is reduced with only headlines seen while the layout remains unchanged. And further, the retrieval picture (with the headlines) and the article data representative of the detailed contents are correlated with each other so that, from any headline, the relevant article corresponding to that headline can be displayed.

In the editing device 2, some additional data not stored in the large computer 1 are further inputted, when necessary, from an external data base or the like (not shown), such as text data, image data and audio data (e.g., those of news program corresponding to newspaper article). Such text data, image data and audio data (digitized similarly to the above-described data in the data base) are also edited in the editing device 2 in an adequate format retrievable with facility by the user on the receiving side. (In this case also, as mentioned, layout for displaying the information (text data, image data and audio data) on the screen is edited, and further such data and the newspaper articles corresponding thereto are correlated with each other.)

Both the image data and the audio data are compressed when necessary. And advertisement data provided by any advertisement sponsor can be inserted suitably in the newspaper data. In this case, the advertisement data are displayed suitably on the receiving side during retrieval of the newspaper data.

As described above, the multimedia newspaper data, which are edited in a format retrievable with facility on the receiving side and are composed principally of newspaper data with text data, image data and audio data, are transmitted to a servicing company 3 via, e.g., a ground data network.

To the servicing company 3, there are also supplied data of magazines, books and so forth provided by a publishing company as another data provider, and further a program (composed of video and audio signals) provided by a television station. The data of magazines, books and so forth provided by the publishing company can be formed into multimedia data combined with text data, image data and audio data (hereinafter referred to as multimedia magazine/book data), similarly to the aforementioned data provided by a newspaper company.

The data transmitted to the servicing company 3 are transmitted therefrom to a satellite (broadcasting satellite BS or communication satellite CS) 4, from which the data are further transmitted to the receiving side (e.g., user or contractor at home). That is, the data provided by the data provider are transmitted via the satellite network to the user on the receiving side.

Figure 2:
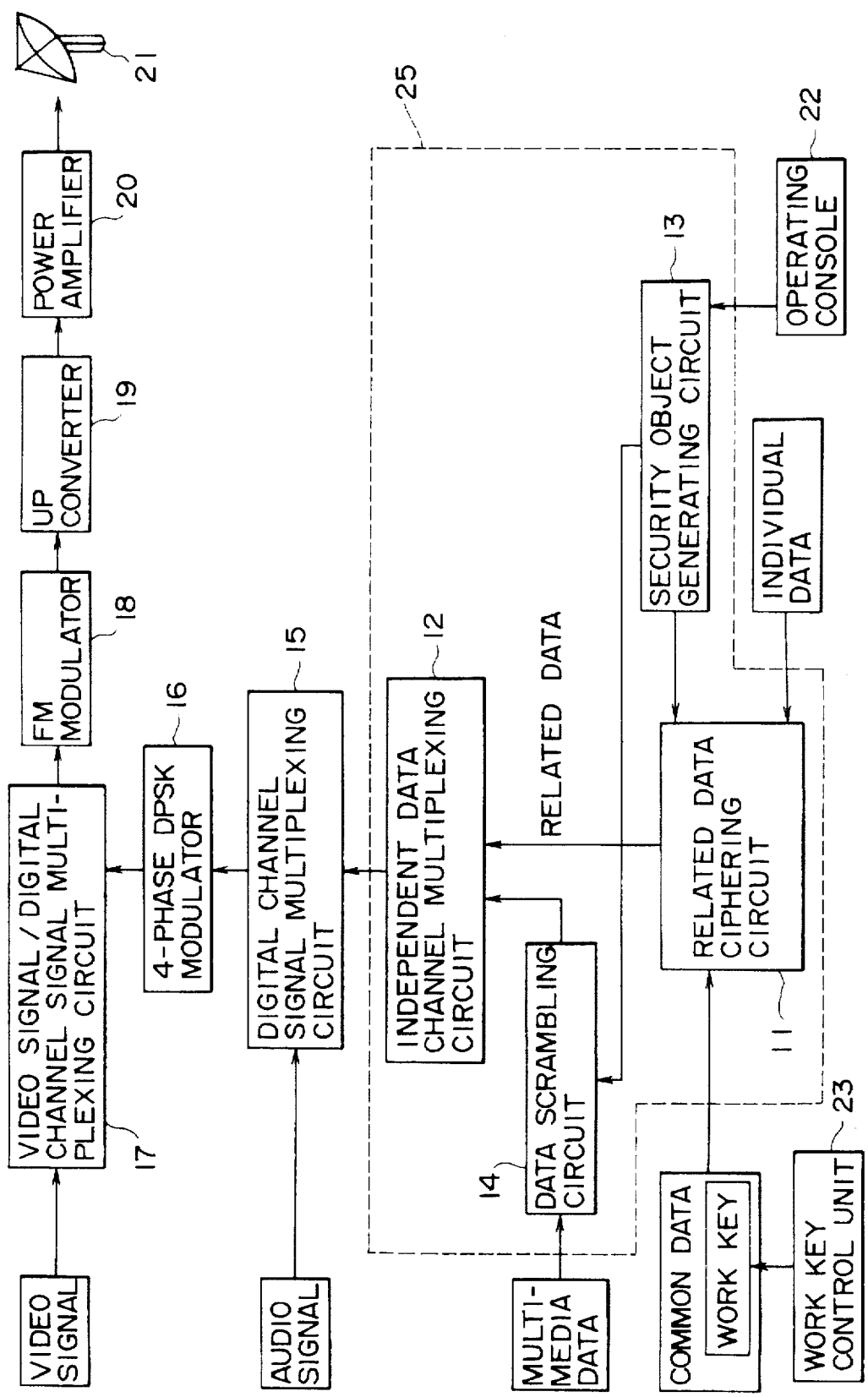
FIG. 2 is a block diagram showing an exemplary constitution of a transmitter owned by a servicing company 3 in FIG. 1.

The servicing company 3 has such a transmitter as shown in FIG. 2 for example. The multimedia newspaper data from the newspaper company and the multimedia magazine/book data from the publishing company are multiplexed by an unshown multiplexing circuit and then are supplied as multimedia data to an encoder 25 which constitutes the transmitter. In the servicing company 3, the multimedia magazine/book data for example are edited, when necessary, in a format retrievable with facility by the user on the receiving side and then are multiplexed with the multimedia newspaper data.

To the encoder 25, other various data are also inputted in addition to the multiplexed multimedia magazine/book data and multimedia newspaper data (hereinafter referred to as multimedia data inclusive of both data), such as common information including a data identifier (for identifying the multimedia data) and a work key, and individual information including user control information which comprises unique receiver ID affixed to each data receiver on the receiving side and contract content corresponding to the relevant receiver ID (including a data identifier of the multimedia data which represents the contract of the user having the data receiver corresponding to the relevant receiver ID).

Out of the above various data, the multimedia data are supplied to a data scrambling circuit 14. This circuit 14 is also supplied with a scramble program obtained from a security object generating circuit 13 which consists of a computer with CPU, ROM and RAM; and control data (e.g., scramble key, operation parameter used for program operation, etc.) required for such scrambling. The data scrambling circuit 14 scrambles the multimedia data by executing the scramble program and using the control data when necessary and then outputs the scrambled data to an independent data channel multiplexing circuit 12.

The scramble program obtained from the security object generating circuit 13 is periodically changeable by altering the algorithm or the operation parameter. And when necessary (e.g., when illegal reception is probable on the receiving side), this program is changeable also by inputting a program change instruction (with alteration of the parameter or the algorithm) from an external device to an operating console 22.

Therefore, even if the scrambling algorithm in this case is known to any non-contractor, illegal reception on the receiving side can be prevented by altering the scrambling algorithm as described above to reinforce the security control.

The security object generating circuit 13 generates, in addition to the aforementioned scramble program, a descramble program for descrambling the data processed by the scramble program, and control data (e.g., the aforementioned scramble key) required for the descrambling process. The circuit 13 further functions to convert the descramble program (source program) into an intermediate code such as p-code or byte code not dependent on hardware, i.e., an intermediate code interpreted and executed by a virtual machine, and then outputs an object of the intermediate code of the descramble program (hereinafter referred to as security object) to a related data ciphering circuit 11. When necessary, the control data is included in the security object.

In this case, therefore, the descramble program is transmitted in the converted form of an intermediate code, so that the amount of the transmission data can be reduced in comparison with another case where the source program is transmitted in its original form.

The related data ciphering circuit 11 is supplied with, in addition to the security object, common data and individual data. In the ciphering circuit 11, both the common data and the individual data are ciphered by using the work key included in the common data and obtained in the preceding transmission. Accordingly, on the receiving side, the ciphered common data and individual data are deciphered by using the work key received already. Such work key is changed either periodically or nonperiodically. Changing the work key is controlled by a work key control unit 23.

The data thus ciphered are supplied as related data to an independent data channel multiplexing circuit 12. This circuit 12 multiplexes the scrambled multimedia data supplied from the descrambling circuit 14 and the related data supplied from the ciphering circuit 11, and then outputs the multiplexed data to a digital channel signal multiplexing circuit 15.

The configuration mentioned above constitutes an encoder 25 for producing data in an independent data channel which will be described later with reference to FIG. 3.

To the digital channel signal multiplexing circuit 15, there is also inputted the audio signal (composed at least partially of the aforementioned audio signal of the program provided by the television station) transmitted as a digital channel signal. The digital channel signal multiplexing circuit 15 multiplexes the input audio signal (digital audio signal) and the data supplied from the encoder 25, and then outputs the multiplexed data to a four-phase DPSK modulator 16.

This modulator 16 executes four-phase DPSK modulation of the input data and outputs the modulated data to a video signal/digital channel signal multiplexing circuit 17. The video signal of the program provided by the television station is also inputted to this multiplexing circuit 17. The audio signal inputted to the digital channel signal multiplexing circuit 15 is a digital one, whereas the video signal inputted to the video signal/digital channel signal multiplexing circuit 17 is an analog one.

In the future, it may be possible to modify the above constitution in such a manner that the video signal is processed in the form of a digital signal instead of an analog one, and the entire data transmitted from the data providers (newspaper company, publishing company and television station in FIG. 1) are handled as multimedia data.

In another modification, the video signal may be scrambled and inputted to the video signal/digital channel signal multiplexing circuit 17. In this case, the scramble key used for scrambling the video signal is inputted to, e.g., the related data ciphering circuit 11 to be ciphered therein and is included in the related data.

The video signal/digital channel signal multiplexing circuit 17 performs frequency multiplexing of the input video signal and the signal supplied from the four-phase DPSK modulator 16, and then outputs the multiplexed signal to an FM modulator 18. Subsequently the FM modulator 18 executes frequency modulation of a predetermined carrier with the input signal and outputs the frequency-modulated signal to an up converter 19, where the input FM signal is frequency-converted into a signal of a gigahertz-order frequency band (e.g., Ku band or Ka band). The FM signal outputted from the up converter 19 is power-amplified by a power amplifier 20 and then is supplied to a transmitting antenna 21, from which the amplified signal is transmitted to a satellite 4 (FIG. 1).

Figure 3:
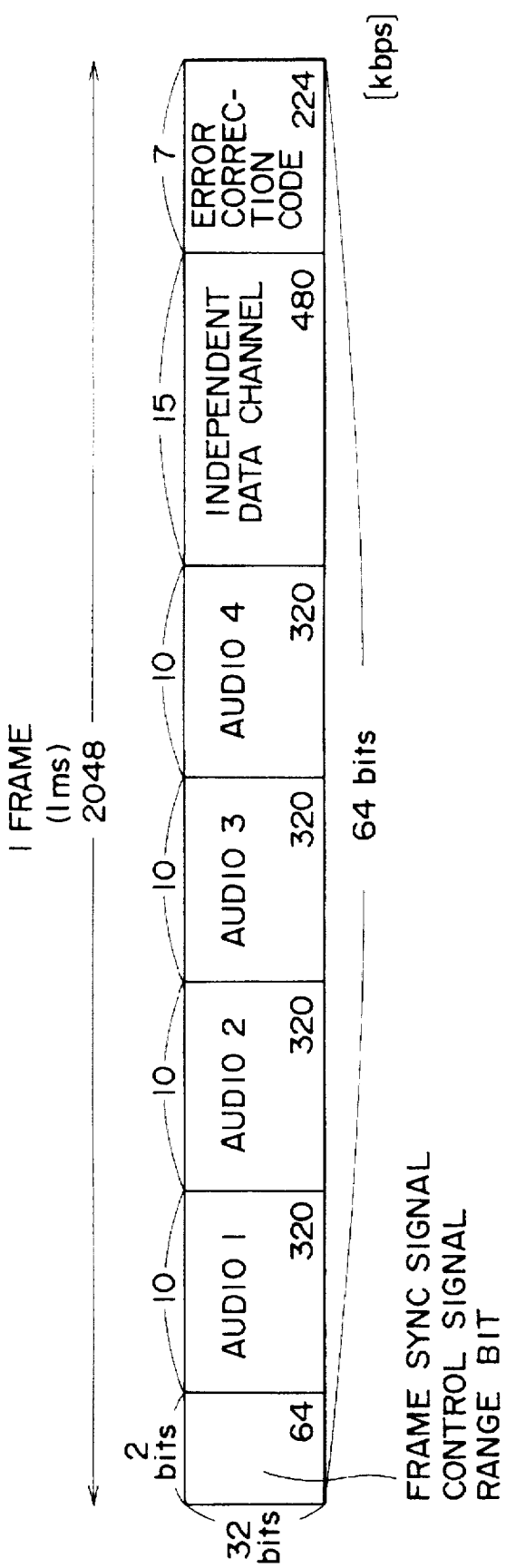
FIG. 3 is an explanatory diagram showing a format of digital channel data.

FIG. 3 shows a format of the four-phase DPSK modulated digital channel data (A-mode format). As shown in this diagram, data of 1 frame is composed of a total of 2048 bits (horizontal 64 bits×vertical 32 bits). In the range of first 2 bits×32 bits, a frame sync signal, a control signal and a range bit signal are arranged (recorded). Since the data of 1 frame is transmitted during a time of 1 ms, the transmission rate is 2.048 Mbps.

The frame sync signal is used for synchronizing each frame. And the control signal indicates whether the transmission mode is A-mode or B-mode, and also indicates whether the television audio signal (audio signal of the program provided from the television station) (arranged in Audio 1 and 2 in FIG. 3) is whether a stereo signal, a 1-channel monaural signal or a 2-channel monaural signal. Although not shown, a B-mode format is the same in data quantity as the A-mode format but is different therefrom in the point that the audio signal has two channels each composed of 640 bits.

In Audio 1 to 4 described below, high-order 10 bits of effective digits out of 14-bit quantized audio data are selected and arranged. The range bit signal represents the range of such selected audio data.

As shown in FIG. 3, the audio data of Audio 1 to 4 are recorded (arranged) respectively in the next range of 10×32 bits posterior to the first 2×32 bits and in the succeeding three ranges each composed of 10×32 bits. (However, there may be a case where some other data than the audio data are arranged in Audio 3 and 4.) Thereafter, data of the independent data channel are arranged in the range of 15×32 bits posterior to the data of Audio 4, and a horizontal error correction code is arranged in the last range of 7×32 bits.

The data of the independent data channel shown in FIG. 3 are transferred per predetermined packet as a unit. Each packet is composed of 288 bits for example, wherein first 16 bits are used to form a header, and substantial data are arranged in the succeeding 190 bits, and an error correction code of that packet is arranged in the last 82 bits. The header includes at least a service identification code and an error correction code (check bit) thereof. The service identification code includes a code for identifying whether the data arranged in the relevant packet are the related data or the multimedia data.

The related data outputted from the related data ciphering circuit 11 shown in FIG. 2 and the multimedia data outputted from the data scrambling circuit 14 are allocated, per packet as a unit, to the independent data channel. And a service identification code is set in accordance with the data allocated to the relevant packet (i.e., depending on whether the allocated data are the related data or the multimedia data).

The above-described data are transmitted from the servicing company 3 in FIG. 1 to the satellite 4 and are further transmitted from the satellite 4 to the user (contractor) at each home. Subsequently the signal obtained from the satellite 4 is received by an outdoor device (parabola antenna) 5 at each home (on the receiving side) and then is converted into a predetermined intermediate-frequency signal (IF signal). Thereafter the IF signal is inputted to a data receiver 6. The IF signal thus inputted to the data receiver 6 is demodulated and is recorded on a recording medium such as a magneto-optical disk (hereinafter referred to as MO) 8 or some other magnetic disk (hard disk).

After the data have thus been recorded on the MO 8, the user on the receiving side can retrieve any necessary data at any desired time and deliver the data to a monitor 7 to display the same (or can output the data from an unshown loudspeaker). Further the user can load the MO 8 in a portable terminal or a desk-top terminal and retrieve any desired data therefrom to display the same.

Figure 4:
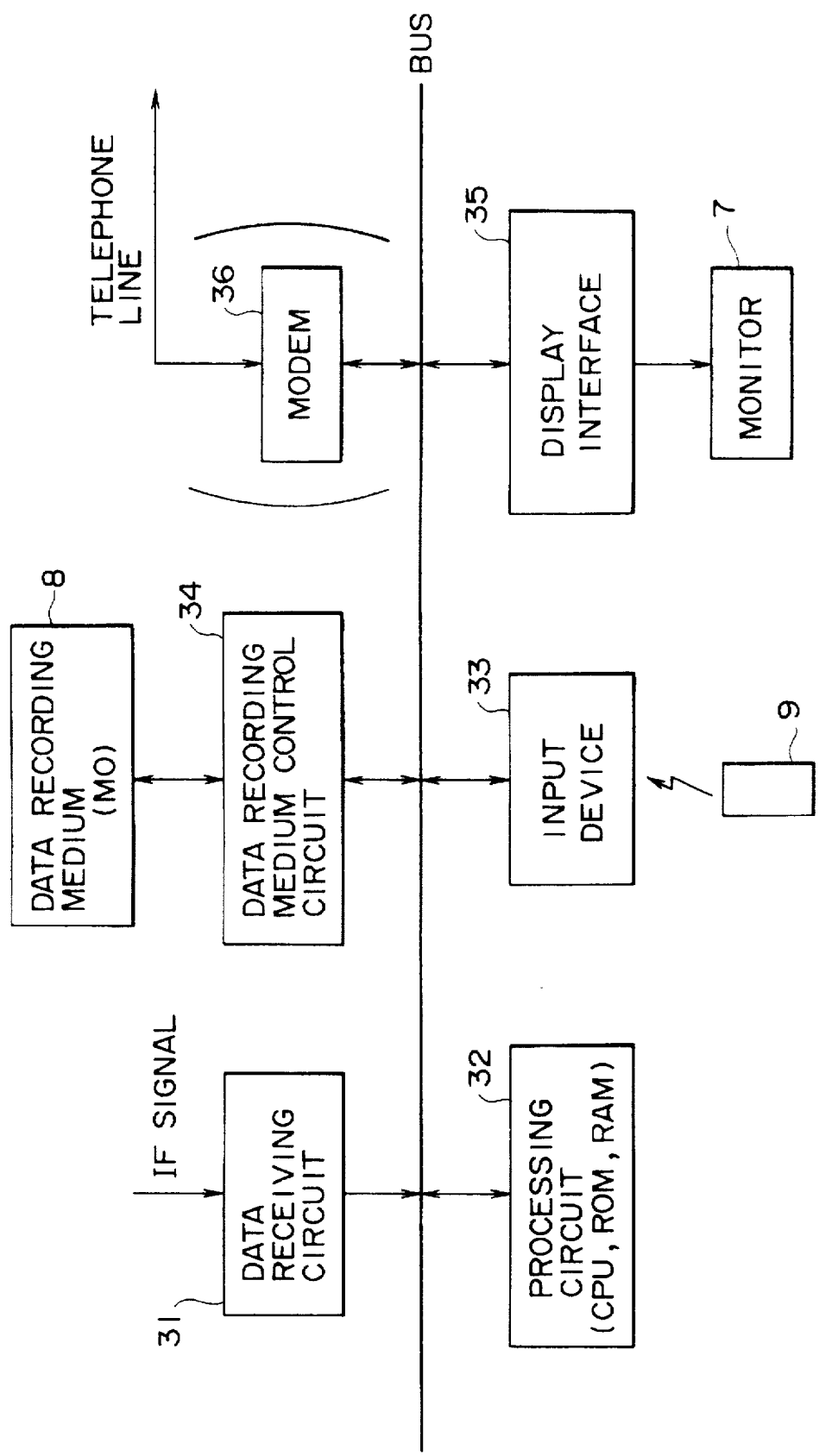
FIG. 4 is a block diagram showing a detailed constitution of a data receiver 6 in FIG. 1.

FIG. 4 shows an exemplary constitution of the data receiver 6. The blocks constituting the data receiver 6 are so contrived that the data (including control commands and so forth) are mutually transferred via a bus and also that each block is controlled by a processing circuit 32 which comprises a CPU, a ROM and a RAM. The data receiver 6 is controllable by manipulating a remote controller 9. More specifically, when the remote controller 9 is manipulated, a signal corresponding to such manipulation is received by the processing circuit 32 via an input device 33, and a process corresponding to the signal obtained from the remote controller 9 is executed in the processing circuit 32.

In the data receiver 6, an IF signal from the outdoor device 5 is supplied to a data receiving circuit 31. And the input IF signal is demodulated in the data receiving circuit 31. Further in the data receiving circuit 31, there are decoded, under control of the processing circuit 32, the multimedia data contracted by the user (e.g., newspaper data from a specific newspaper company and text data, image data and audio data appendant thereto; data of specific magazines or books and text data, image data and audio data appendant thereto), and the decoded data are outputted to a data recording medium control circuit 34. Then this control circuit 34 records, on the MO 8, the data obtained from the data receiving circuit 31.

Thereafter when the remote controller 9 is manipulated, a manipulation signal corresponding to such manipulation is supplied to an input device 33, which then transfers the received signal to the processing circuit 32. In response to such manipulation signal, the processing circuit 32 enables the data recording medium control circuit 34 to reproduce the data recorded on the MO 8, and the reproduced data is supplied to a display interface 35. Subsequently the display interface 35 converts the input data into a video signal and delivers the converted signal to a monitor 7 to display the same. (When the data reproduced from the MO 8 is audio data, such data is outputted from an unshown loudspeaker.) In this manner, the contractor is enabled to view the contracted newspaper, magazine, book and also the text, image and audio appendant thereto.

FIG. 5 shows a further detailed exemplary constitution of the data receiving circuit 31. The IF signal obtained from the outdoor device 5 is inputted to an FM demodulator 71. The FM demodulator 71 demodulates the IF signal to recover the baseband signal and delivers the same to a video signal/digital channel signal separating circuit 72. Then this circuit 72 separates the input signal into a video signal and a digital channel signal. The video signal is supplied to a decoder 90, where the video signal is descrambled, if reception of the video signal is contracted, by the use of a scramble key supplied from the processing circuit 32 as will be described later. (When the video signal is in the form of compressed data, a process of data expansion is executed in the decoder 90.) The descrambled video signal (or the expanded data obtained out of the compressed video data ) is outputted via the display interface 35 (FIG. 4) to the monitor 7 to be displayed thereon.

Meanwhile the digital channel signal separated by the video signal/digital channel signal separating circuit 72 is inputted to a four-phase DPSK demodulator 73 to be thereby demodulated. The signal outputted from the four-phase DPSK demodulator 73 is supplied to a digital channel signal separating circuit 74 to be separated into the audio signal (arranged in Audio 1 to 4 shown in FIG. 3) and the independent data channel signal. When the audio signal is the one corresponding to the above-described video signal, the audio signal is processed in the same manner as the video signal and then is supplied to a loudspeaker to be emitted as sound therefrom.

The digital channel signal separating circuit 74 outputs the separated independent data channel signal to a multimedia data/related data separating circuit 81. Then this circuit 81 separates the input signal into the multimedia data and the related data, and then outputs the multimedia data to a data descrambling circuit 87 while outputting the related data to a related data decoding circuit 82. The above operation is performed with reference to the aforementioned service identification code.

The related data decoding circuit 82 decodes the input related data by the use of a work key stored in a work register 83. Out of the result of such decoding, the data identifier included in the common data is outputted to a down-load yes/no decision circuit 84, while any other data (security object, individual data, common data except data identifier, and scramble key used for scrambling the video signal) are outputted to the processing circuit 32.

When the data supplied to the processing circuit 32 from the related data decoding circuit 82 includes the scramble key used for scrambling the video signal from the television station, the processing circuit 32 outputs such data to the decoder. Then the decoder descrambles, by using the scramble key as described, the video signal outputted from the video signal/digital channel signal separating circuit 72.

The processing circuit 32 also supplies the work key, which is included in the common data from the related data decoding circuit 82, to the work register 83 to store the work key therein. In the related data decoding circuit 82, the related data supplied next is decoded by using the work key thus stored in the work register 83. Therefore, security of the related data can be enhanced by altering, either periodically or non-periodically, the work key used in the transmitter of the servicing company 3 shown in FIG. 2.

Further in the processing circuit 32, the security object (of the intermediate code) included in the result from the related data decoding circuit 82 is once recorded on the MO 8 via the data recording medium control circuit 34. Thereafter the processing circuit 32 reads out the security object recorded on the MO 8, i.e., the descramble program of the intermediate code, and converts (translates) the same into a machine code executable by the data descrambling circuit 87. The descramble program converted to a file of an executable format is supplied to the MO 8 again to be recorded thereon.

Conversion of the descramble program into a machine code is executed by utilizing the idle time of a CPU incorporated, e.g., in the processing circuit 32. In addition to the above example where the descramble program of the intermediate code is converted into a machine code after being once recorded on the MO 8, it is also possible to convert the security object of the intermediate code into a machine code without recording the same on the MO 8 in the processing circuit 32 for example. In this case, however, there may arise the necessity of executing the conversion into a machine code during another process of a great load in the processing circuit. Accordingly, the CPU incorporated in the processing circuit 32 needs to satisfy the requisite of high performance.

Thereafter the processing circuit 32 compares user management data, which is included in the individual data supplied from the related data decoding circuit 82, with the stored value in a data-receiver ID register 86. The data-receiver ID relative to the data receiver 6 is stored in this register 86, and the processing circuit 32 first compares the receiver ID, which composes the user management data, with the data-receiver ID stored in the register 86 and, upon coincidence of the compared data, extracts from the user management data the contract content corresponding to that data-receiver ID, and outputs the extracted content to a contract content register 85 to store the same. (Changing the contract content already stored in the register 85 is performed in the same manner.)

After storage of the contract content in the register 85, the down-load yes/no decision circuit 84 compares the contract content with the data identifier supplied from the related data decoding circuit 82. As described, the contract content includes the data identifier of the contracted multimedia data. And when a coincidence is attained between the two compared identifiers and further the coincident identifier is stored in a down-load request setting circuit 88, the down-load yes/no decision circuit 84 outputs to the processing circuit 32 a descramble instruction signal for instructing descramble of the data.

An identifier of the data desired to be downloaded, out of the entire multimedia data contracted by the user (contractor) on the receiving side, is previously registered in the down-load request setting circuit 88 by manipulating the remote controller 9 for example. Therefore, the descramble instruction signal is outputted when the data included in the contracted multimedia data and desired to be down-loaded is received.

In response to the descramble instruction signal received from the down-load yes/no decision circuit 84, the processing circuit 32 reads out the machine-code descramble program recorded on the MO 8 and transfers the program to the data descrambling circuit 87. This circuit 87 has an operational function and executes the descramble program obtained from the processing circuit 32, thereby descrambling the input scrambled multimedia data. Subsequently the multimedia data thus descrambled are supplied via the data recording medium control circuit 34 to the MO 8 to be recorded thereon as described above.

When the control data is included in the security object, the processing circuit 32 transfers the control data to the data descrambling circuit 87 together with the machine-code descramble program. In this case, therefore, the data descrambling circuit 87 executes its descramble process by using such control data.

As described above, the descramble program is received by the data receiver 6 and then the data are descrambled in accordance with the received program, so that proper descrambling can be executed despite any alteration of the scrambling algorithm in the servicing company 3.

Furthermore, the descramble program is notated in the intermediate code which can be interpreted and executed by a virtual machine, and therefore the data descrambling circuit 87 is enabled to realize its process with software on various kinds of microcomputers, whereby the apparatus can be constituted without the necessity of employing any exclusive hardware.

The present invention has been described hereinabove with regard to an exemplary case of its application to a data transmission system which is contrived to transmit data of publications such as newspapers, magazines, books and so forth. However, it is to be noted that the present invention is applicable to any data transmission system designed for transmitting other data as well.

Although the above embodiment represents an exemplary case where data are transmitted via a satellite network, the data transmission line is not limited thereto alone, and it may be any radio network other than the satellite network, and any of various data lines is also usable such as PSTN, ISDN, CATV cable or exclusive line.

The above embodiment is so designed as to transmit a work key for decoding the related data. However, it may be so modified as to transmit the object of the related-data decoding program and to decode the related data by the object.

The operation for scrambling the video signal provided by a television station may be performed by transmitting the object of the descramble program instead of transmitting the scramble key, and the descramble process may be executed by using such object.

Further in addition to the above embodiment where the intermediate code of the descramble program is transmitted, it is also possible to transmit a source program thereof or a program obtained by converting (compiling) the same into a machine code.

In the above embodiment, the security object (descramble program) is transmitted via the same transmission line (satellite network in the embodiment) as that used for the multimedia data. However, it is also possible to use mutually different transmission lines for the security object and the multimedia data individually.

More specifically, as illustrated in FIG. 1 for example, the multimedia data may be transmitted via the satellite network of a great capacity, while the security object (descramble program) may be transmitted via a telephone line (public telephone network) such as ISDN or PSTN. In this case, as shown in FIG. 4 for example, the data receiver 6 needs to be equipped with a modem 36 or the like which serves as an interface of the telephone line.

Hereinafter a further detailed description will be given with regard to the case of transmitting the multimedia data and the descramble program via different transmission lines.

In this embodiment, digitized and scrambled information such as text data of newspapers or magazines is transmitted to the data receiving terminal of each user via an independent data channel of a satellite broadcasting network. And when necessary, the user outputs the data, which is stored in the data receiving terminal, from a monitor or a printer.

Figure 6:
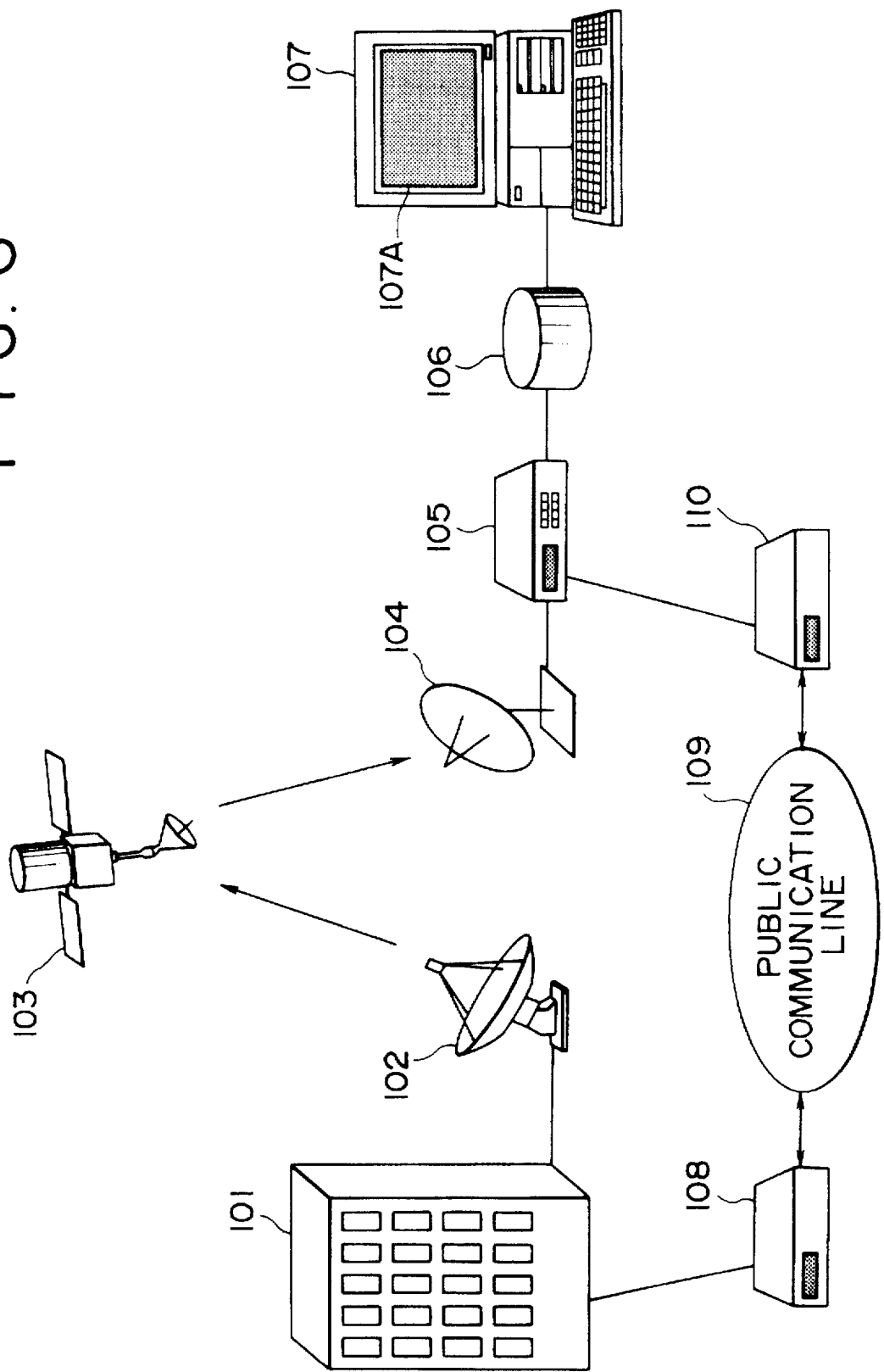
FIG. 6 is a simplified diagram schematically showing the constitution of the data transmission system in FIG. 1.

In FIG. 6, a data source station 101 is a broadcasting station which digitizes and scrambles the text data of newspapers or magazines and broadcasts such data to each user. A satellite 103 receives the data sent from a transmitting antenna 102 and then sends the data toward a receiving antenna 104 of each user.

A receiver 105 extracts, out of the various data received via the receiving antenna 104, the data broadcast from the data source station 101, and then demodulates the extracted data. A memory device 106 stores the demodulated data therein. A data receiving terminal 107 decodes the data in the memory device 106 for descrambling the same and displays the content of the decoded data. Modems 108 and 110 function via a public communication line (e.g., telephone line) 109 to transfer the data between the data source station 101 and the data receiving terminal 107.

The operation performed in the above constitution will now be described below with reference to a flow chart of FIG. 7 which shows the procedure of the operation.

The data digitized and scrambled in the data source station 101 and the unique identification code (data ID) affixed to the individual data are inputted via the transmitting antenna 102, the satellite 103 and the receiving antenna 104 to the receiver 105 and then are demodulated therein. The data thus demodulated are stored in the memory device 106 while being retained in the scrambled format. As shown in FIG. 7, the user first manipulates the data receiving terminal 107 to select the desired newspaper, magazine or other data (step 111).

The data receiving terminal 107 makes a decision as to whether the program having a decoding function to descramble the data corresponding to the identification code (data ID) of the selected data is existent or not in the entire data stored in the memory device 106 (step 112). The decision as to the existence or non-existence of the program is executed on the basis of whether a coincidence is attained or not between the program ID included in the program and the data ID. Since this program is not existent at the beginning, the data receiving terminal 107 sets a communication line to the data transmitting station, which is a broadcasting station in this embodiment, by controlling the receiver 105 and the modem 110 (step 113).

Upon setting of a communication line between the data receiving terminal 107 and the data source station 101, the data receiving terminal 107 transmits the selected data ID and the unique identification code (terminal ID) of the data receiving terminal 107 to the data source station 101 via the modem 110, the public communication line 109 and the modem 108, thereby requesting the decoding program from the data source station 101 (step 114). In response to such a request for the program, the data source station 101 prepares, on the basis of the received data ID and terminal ID, a program adapted to decode the data selected only in the data receiving terminal 107 having the relevant terminal ID (step 115).

The program thus prepared is transmitted to the data receiving terminal 107 via the modem 108, the public communication line 109 and the modem 110 (step 116). Upon reception of the program, the data receiving terminal 107 stores the program in the memory device 106 and disconnects the line. Subsequently the data receiving terminal 107 executes the program to decode the data (step 118), thereby completing the process.

Posterior to the above operation, the selected-data decoding program is existent in the memory device 106 except when there arises the necessity of changing the data to be selected or changing the program, so that the operation proceeds to step 118 after execution of the decision at step 112.

Figure 7:
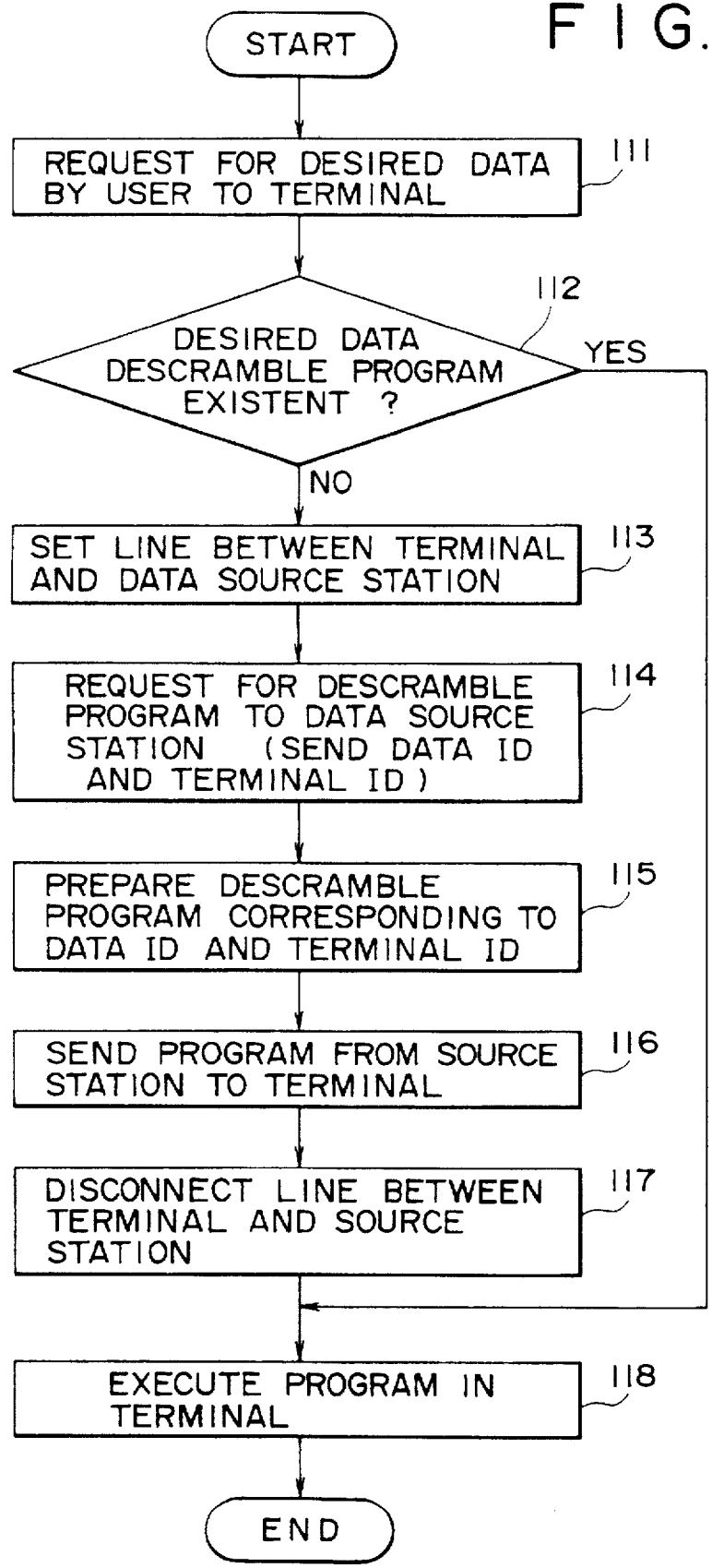
FIG. 7 is a flow chart showing a concrete operation procedure in the data transmission system of the present invention.
Figure 8:
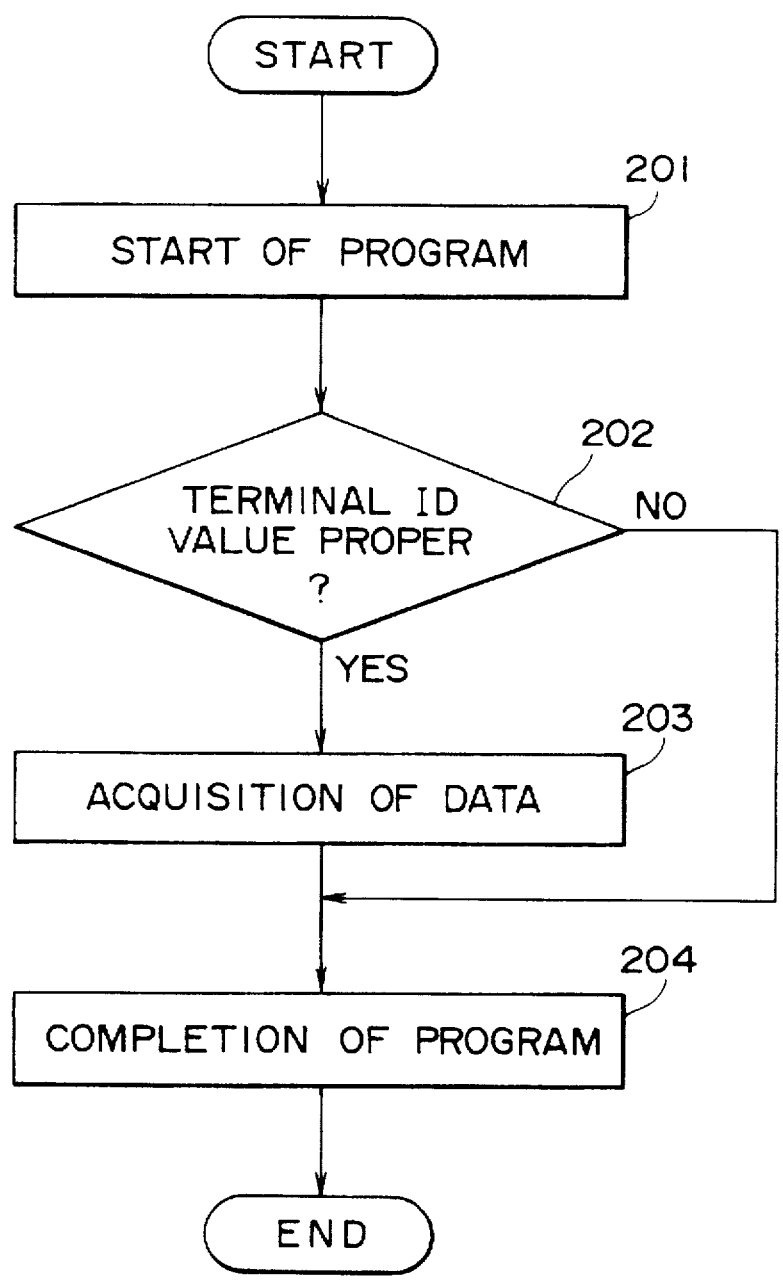
FIG. 8 is a flow chart showing a concrete operation procedure to execute a program in the data transmission system of the present invention.

FIG. 8 is a flow chart showing a concrete procedure for the execution at step 118 in FIG. 7. When the program is started in FIG. 8 (step 201), the data receiving terminal 107 reads out the stored terminal ID, in accordance with the program, from the memory incorporated in the data receiving terminal 107, and then compares the read terminal ID with the terminal ID preset in the program to check if a coincidence is attained, thereby making a decision as to whether the value of the terminal ID is proper or not (step 202).

If the result of the above decision signifies that the value of the terminal ID is not proper, the program is completed (step 204), and the user is rendered incapable of decoding the data. Meanwhile, if the result of the decision signifies that the value of the terminal ID is proper, the process of decoding the data is executed in accordance with the program to thereby descramble the data, so that the user can acquire the desired data as an output from the monitor 107A or an unshown printer.

Although in this embodiment a decision is made at the start of the program as to a coincidence of the terminal ID, it may be so modified that a timer function is included in the program and a periodical check of the terminal ID is executed at a fixed time interval.

The embodiment has been explained above with regard to an exemplary case where the entire program for acquiring the data is sent out from the data source station 101. However, it is also possible to achieve the purpose by sending out only a portion of the program to decode the scrambled data and calling the decoding program at a desired time from the data acquiring program. In this case, the required communication time can be shortened since the program to be transmitted via a communication line such as a telephone line is reduced in amount.

Furthermore the data described above may also include audio data such as music, in addition to text data.

Thus, according to the data transmitter of the present invention, security control is enhanced to realize prevention of illegal reception on the receiving side.

Meanwhile according to the data receiver of the present invention, the received data can be descrambled despite alteration of the scrambling algorithm on the transmitting side.

Also according to another data receiver of the present invention, the processing system for descrambling the data can be constructed of a virtual machine to consequently accomplish constitution of the data receiver without the necessity of employing any exclusive hardware.

Further according to the data transmission system of the present invention, scrambled data are transmitted simultaneously by broadcasting to the entire data receiving terminals from a data source station such as a broadcasting station, and a descramble program for decoding the scrambled data is transmitted from the data source station to the individual data receiving terminals via a public communication line. Therefore, even if the descramble key is illegally known to any non-contractor or if a probability of illegal descrambling may arise in the future due to progress of the descrambling technique, it is still possible to prevent unlawful free reception. And there is attainable another advantageous effect that a prompt countermeasure can be taken by altering the program or the scrambling method.

What is claimed is:

1. A data transmitter for transmitting data to a data receiving terminal, comprising:

a data source for storing predetermined data to be transmitted;

first generating means for producing both a predetermined scrambling program for scrambling said predetermined data and control data to be used in the scrambling process;

scrambling means for scrambling the predetermined data in accordance with said scrambling program;

second generating means for producing a predetermined descrambling program for descrambling the scrambled data obtained from said scrambling means; and transmitting means for transmitting the scrambled data, the descrambling program and the control data to said data receiving terminal.

2. The data transmitter according to claim 1, wherein said control data includes a scramble key.

3. The data transmitter according to claim 1, wherein said transmitting means transmits the scrambled data via a first communication form to said data receiving terminal, and transmits the descrambling program via a second communication form to said data receiving terminal; and the capacity of said first communication form is larger than the capacity of said second communication form.

4. The data transmitter according to claim 3, wherein said first communication form is a satellite network or a CATV network; and said second communication form is a telephone line.

5. The data transmitter according to claim 1, wherein said transmitting means multiplexes the scrambled data, the descrambling program and the control data, and transmits the multiplexed data to said data receiving terminal via a satellite network or a CATV network.

6. The data transmitter according to claim 1, wherein said first generating means alters the scrambling program periodically.

7. The data transmitter according to claim 6, further comprising means for enabling non-periodic alteration of the scrambling program.

8. The data transmitter according to claim 1, further comprising means for supplying common data including data ID to identify the predetermined data to be transmitted, and individual data including terminal ID to identify said data receiving terminal; wherein said transmitting means transmits both the common data and the individual data to said data receiving terminal.

9. The data transmitter according to claim 8, wherein said common data includes a cipher key for ciphering the common data and the individual data;

said data transmitter further comprising ciphering means for ciphering both the common data and the individual data by the use of said cipher key and outputting the ciphered data as related data; wherein said transmitting means also transmits said related data to said data receiving terminal.

10. The data transmitter according to claim 1, wherein said descrambling program is composed of an intermediate code not depending on any hardware.

11. A data receiver for receiving the data transmitted from a data transmitter, comprising:

means for receiving the data scrambled in accordance with a predetermined scrambling program and transmitted from said data transmitter, said receiving means also receiving control data to be used in the scrambling process, and a predetermined descrambling program for descrambling the scrambled data;

descrambling means for descrambling the scrambled data by the use of said descrambling program and said control data; and memory means for storing the data descrambled by said descrambling means.

12. The data receiver according to claim 11, wherein said control data includes a scramble key.

13. The data receiver according to claim 11, wherein the scrambled data is transmitted via a first communication form from said data transmitter, while the descrambling program is transmitted via a second communication form from said data transmitter; and the capacity of said first communication form is larger than the capacity of said second communication form.

14. The data receiver according to claim 13, wherein said first communication form is a satellite network or a CATV network; and said second communication form is a telephone line.

15. The data receiver according to claim 11, wherein the scrambled data, the descrambling program and the control data are multiplexed, and the multiplexed data are transmitted via a satellite network or a CATV network from said data transmitter.

16. The data receiver according to claim 11, wherein said scrambling program is altered periodically on the side of said data transmitter, and said descrambling program is altered in accordance with the alteration of said scrambling program.

17. The data receiver according to claim 11, wherein said receiving means further receives common data including data ID to identify said predetermined data to be transmitted, and individual data including first terminal ID to identify said data receiver;

said data receiver further comprising: a register for storing a second terminal ID unique to said data receiver; and means for comparing said first terminal ID and said second terminal ID with each other and producing, only when a coincidence is attained therebetween, an instruction signal to instruct said descrambling means to descramble said scrambled data.

18. The data receiver according to claim 17, wherein said common data includes a cipher key for ciphering the common data and the individual data, and both said common data and individual data are ciphered by the use of said cipher key;

said data receiver further comprising means for deciphering both said ciphered common data and individual data by the use of said cipher key.

19. The data receiver according to claim 11, wherein said descrambling program is composed of an intermediate code not depending on any hardware;

said data receiver further comprising means for converting said descrambling program of the intermediate code into a machine code.

20. A data providing system comprising:

a center for providing data; and a data receiving terminal to receive the data provided from said center;

wherein said center comprises:

a data source for storing predetermined data to be transmitted:

first generating means for producing both a predetermined scrambling program for scrambling said predetermined data and control data to be used in the scrambling process;

scrambling means for scrambling the predetermined data in accordance with said scrambling program;

second generating means for producing a predetermined descrambling program for descrambling the scrambled data obtained from said scrambling means; and transmitting means for transmitting the scrambled data, the descrambling program and the control data to said data receiving terminal;

and said data receiving terminal comprises:

means for receiving the scrambled data, the control data to be used in the scrambling process, and a predetermined descrambling program for descrambling the scrambled data;

descrambling means for descrambling the scrambled data by the use of said descrambling program and said control data; and memory means for storing the data descrambled by said descrambling means.

21. The data providing system according to claim 20, wherein said control data includes a scramble key.

22. The data providing system according to claim 20, wherein said transmitting means transmits the scrambled data via a first communication form to said data receiving terminal, and transmits the descrambling program via a second communication form to said data receiving terminal; and the capacity of said first communication form is larger than the capacity of said second communication form.

23. The data providing system according to claim 22, wherein said first communication form is a satellite network or a CATV network; and said second communication form is a telephone line.

24. The data providing system according to claim 20, wherein said transmitting means multiplexes the scrambled data, the descrambling program and the control data, and transmits the multiplexed data to said data receiving terminal via a satellite network or a CATV network.

25. The data providing system according to claim 20, wherein said first generating means alters the scrambling program periodically, and said second generating means alters the descrambling program in accordance with the alteration of the scrambling program.

26. The data providing system according to claim 25, further comprising means for enabling non-periodic alteration of the scrambling program.

27. The data providing system according to claim 20, further comprising means for supplying common data including data ID to identify the predetermined data to be transmitted, and individual data including terminal ID to identify said data receiving terminal;

wherein said transmitting means transmits both the common data and the individual data to said data receiving terminal; said receiving means further receives the common data including data ID to identify the predetermined data to be transmitted, and the individual data including first terminal ID to identify said data receiving terminal; and said data receiving terminal further comprises a register for storing a second terminal ID unique to said data receiver, and means for comparing said first terminal ID and said second terminal ID with each other and, only when a coincidence is attained therebetween, producing an instruction signal to instruct said descrambling means to descramble the scrambled data.

28. The data providing system according to claim 27, wherein said common data includes a cipher key for ciphering the common data and the individual data;

said center further comprises ciphering means for ciphering both the common data and the individual data by the use of said cipher key and outputting the ciphered data as related data; and said transmitting means transmits said related data also to said data receiving terminal;

wherein said data receiving terminal further comprises means for deciphering the ciphered common data and individual data by the use of said cipher key.

29. The data providing system according to claim 20, wherein said descrambling program is composed of an intermediate code not depending on any hardware; and said data receiving terminal further comprises means for converting said descrambling program of the intermediate code into a machine code.

* * * * *